United States Patent
Chamberlain et al.

(10) Patent No.: US 9,430,415 B2
(45) Date of Patent: Aug. 30, 2016

(54) CONCURRENT DUMPING OF LARGE ADDRESS SPACE

(71) Applicant: GLOBALFOUNDRIES INC., Grand Cayman (KY)

(72) Inventors: Richard N. Chamberlain, Southampton (GB); Howard J. Hellyer, Winchester (GB); Matthew F. Peters, Winchester (GB); Adam J. Pilkington, Hampshire (GB)

(73) Assignee: GLOBALFOUNDRIES INC., Grand Cayman (KY)

( * ) Notice: Subject to any disclaimer, the term of this patent is extended or adjusted under 35 U.S.C. 154(b) by 342 days.

(21) Appl. No.: 13/918,045

(22) Filed: Jun. 14, 2013

(65) Prior Publication Data

US 2014/0372712 A1   Dec. 18, 2014

(51) Int. Cl.
G06F 13/00 (2006.01)
G06F 13/16 (2006.01)
G06F 11/00 (2006.01)

(52) U.S. Cl.
CPC .......... *G06F 13/1626* (2013.01); *G06F 11/00* (2013.01)

(58) Field of Classification Search
CPC ........ G06F 12/00; G06F 12/02; G06F 12/16; G06F 13/00; G06F 13/16; G06F 17/30
See application file for complete search history.

(56) References Cited

U.S. PATENT DOCUMENTS

| | | | |
|---|---|---|---|
| 5,293,612 A | 3/1994 | Shingai | |
| 7,395,400 B2 | 7/2008 | Mohideen et al. | |
| 8,131,973 B2 | 3/2012 | Sugawara | |
| 8,151,143 B2 | 4/2012 | Li et al. | |
| 2002/0019903 A1* | 2/2002 | Lin | G06F 13/1626 710/305 |
| 2003/0145157 A1* | 7/2003 | Smullen | G06F 11/1441 711/104 |
| 2004/0039971 A1 | 2/2004 | Bakke | |
| 2006/0143534 A1 | 6/2006 | Dall | |
| 2008/0133968 A1* | 6/2008 | Muppirala | G06F 11/0778 714/13 |
| 2008/0209264 A1 | 8/2008 | Morse et al. | |
| 2008/0294839 A1* | 11/2008 | Bell | G06F 9/5016 711/104 |
| 2009/0089336 A1* | 4/2009 | Dewey | G06F 11/0778 |
| 2010/0162052 A1* | 6/2010 | Shimogawa | G06F 11/3476 714/48 |
| 2012/0185953 A1 | 7/2012 | Van Riel et al. | |
| 2013/0080689 A1* | 3/2013 | Jo | G06F 12/0246 711/103 |

OTHER PUBLICATIONS

Huang et al.; "Optimizing Crash Dump in Virtualized Environments"; VEE'10; Mar. 17-19, 2010; Pittsburgh, PA; Copyright 2010.

* cited by examiner

*Primary Examiner* — Charles Rones
*Assistant Examiner* — Han Doan
(74) *Attorney, Agent, or Firm* — Scully, Scott, Murphy & Presser, P.C.

(57) ABSTRACT

A method for managing concurrent system dumps of address spaces of memory of a computing system. The method comprises analyzing address space of memory to determine high priority areas and low priority areas of the address space. The method further comprises stopping all application threads of memory. In addition, the method further comprises performing a system dump of all the high priority areas of the address space. Moreover, the method further comprises initiating a background thread that performs a system dump of the low priority areas in background of the address space, and allowing, by the one or more computer processors, all of the application threads of memory to restart.

17 Claims, 5 Drawing Sheets

CONCURRENT DUMPING OF LARGE ADDRESS SPACE

FIELD OF THE INVENTION

The present invention relates generally to generating memory system dumps, and more particularly to concurrent dumping of large address spaces of memory.

BACKGROUND

An operating system is a software program or a collection of software programs that operate on a computer to provide a platform on which software applications can execute. Further, operating systems typically perform essential functions required to maintain proper operation of software applications executing on the computer. However, some software applications may experience error conditions. For instance, a software error or crash can cause other software executing on the computer to cease execution of program instructions. A software developer or systems administrator may correct a defect in a software program to improve reliability and performance of the software program. In order to correct the defect in the software program, software developers typically employ a variety of methods or tools. One such tool is generation of a memory dump or system dump.

A memory dump is a recorded state of memory of a software program, typically when the software program experiences a crash. In addition, memory dump generation can serve as a useful debugging aid for identifying the cause of the software program crash. A memory dump can be generated in the following scenarios: manual memory dump generation by a user or systems administrator, automatic generation of a memory dump by an operating system, and/or automatic generation of a memory dump by a software program that experiences crash or error. Further, the time needed to perform a memory dump for a large address space of memory can be long or consuming. For example, sometimes memory dumps are taken for diagnostic purposes, not because of a system crash, and while the memory dump is performed, the software program cannot operate since it might alter memory of an address space that is to be dumped.

SUMMARY

In one embodiment, a method for managing concurrent system dumps of address spaces of memory is provided. The method comprises analyzing, by one or more computer processors, address space of memory to determine high priority areas and low priority areas of the address space. The method further comprises stopping, by the one or more computer processors, all application threads of memory. The method further comprises performing, by the one or more computer processors, a system dump of all the high priority areas of the address space. The method further comprises initiating, by the one or more computer processors, a background thread that performs a system dump of the low priority areas in background of the address space, and allowing, by the one or more computer processors, all of the application threads of memory to restart.

In another embodiment, a computer system for managing concurrent system dumps of address spaces of memory is provided. The computer system comprises one or more processors, one or more computer-readable memories, one or more computer-readable tangible storage devices and program instructions which are stored on at least one of the one or more storage devices for execution by at least one of the one or more processors via at least one of the one or more memories. The computer system further comprises program instructions to analyze address space of memory to determine high priority areas and low priority areas of the address space. The computer system further comprises program instructions to stop all application threads of memory. The computer system further comprises program instructions to perform system dump of all the high priority areas of the address space. The computer system further comprises program instructions to initiate a background thread that performs a system dump of the low priority areas in background of the address space, and allowing, by the one or more computer processors, all of the application threads of memory to restart.

In yet another embodiment, a computer program product for managing concurrent system dumps of address spaces of memory is provided. The computer program product comprises one or more processors, one or more computer-readable memories, one or more computer-readable tangible storage devices and program instructions which are stored on at least one of the one or more storage devices for execution by at least one of the one or more processors via at least one of the one or more memories. The computer program product further comprises program instructions to analyze address space of memory to determine high priority areas and low priority areas of the address space. The computer program product further comprises program instructions to stop all application threads of memory. The computer program product further comprises program instructions to perform system dump of all the high priority areas of the address space. The computer program product further comprises program instructions to initiate a background thread that performs a system dump of the low priority areas in background of the address space, and allowing all of the application threads of memory to restart.

BRIEF DESCRIPTION OF THE SEVERAL VIEWS OF THE DRAWINGS

Novel characteristics of the invention are set forth in the appended claims. The invention itself, however, as well as preferred mode of use, further objectives, and advantages thereof, will be best understood by reference to the following detailed description of the invention when read in conjunction with the accompanying Figures, wherein like reference numerals indicate like components, and:

DETAILED DESCRIPTION

The present invention includes methods of operation for management of concurrent system dumps of large address spaces of memory of a computing device. In at least one embodiment, management of the system dump includes, analyzing address spaces of memory to determine high priority areas and low priority areas of the address spaces, stopping operation of all application threads of computing system 100, dumping high priority areas of the address space, initiating a background thread that dumps the low priority areas in background of memory, and allowing operation of the application threads to restart. For example, the back background thread can also dump the low priority areas in background of memory in substantially parallel to restarting the application threads. One of skilled in the art would appreciate that processes running in parallel do not have to be exactly in timing step.

According to aspects of the present invention, time taken to produce a system dump for a large address space can be substantial. In some instances, system dumps are taken for diagnostic purposes, not because of a crash, and it is expected that the application thread will continue after the dump is taken. However while the dump is being taken the application thread cannot run since it might alter the memory in the address space that is to be dumped, making the data in the dump inconsistent. The problem solved by this invention is to allow the application thread to continue to run while the dump is taking place, while not consuming a significant amount of memory. One current solution is to copy the entire address space in memory to allow the application to continue and to have a background thread dump this memory to disk later. This allows the application thread to continue to run, but requires twice as much memory as the address space.

Figure 1:
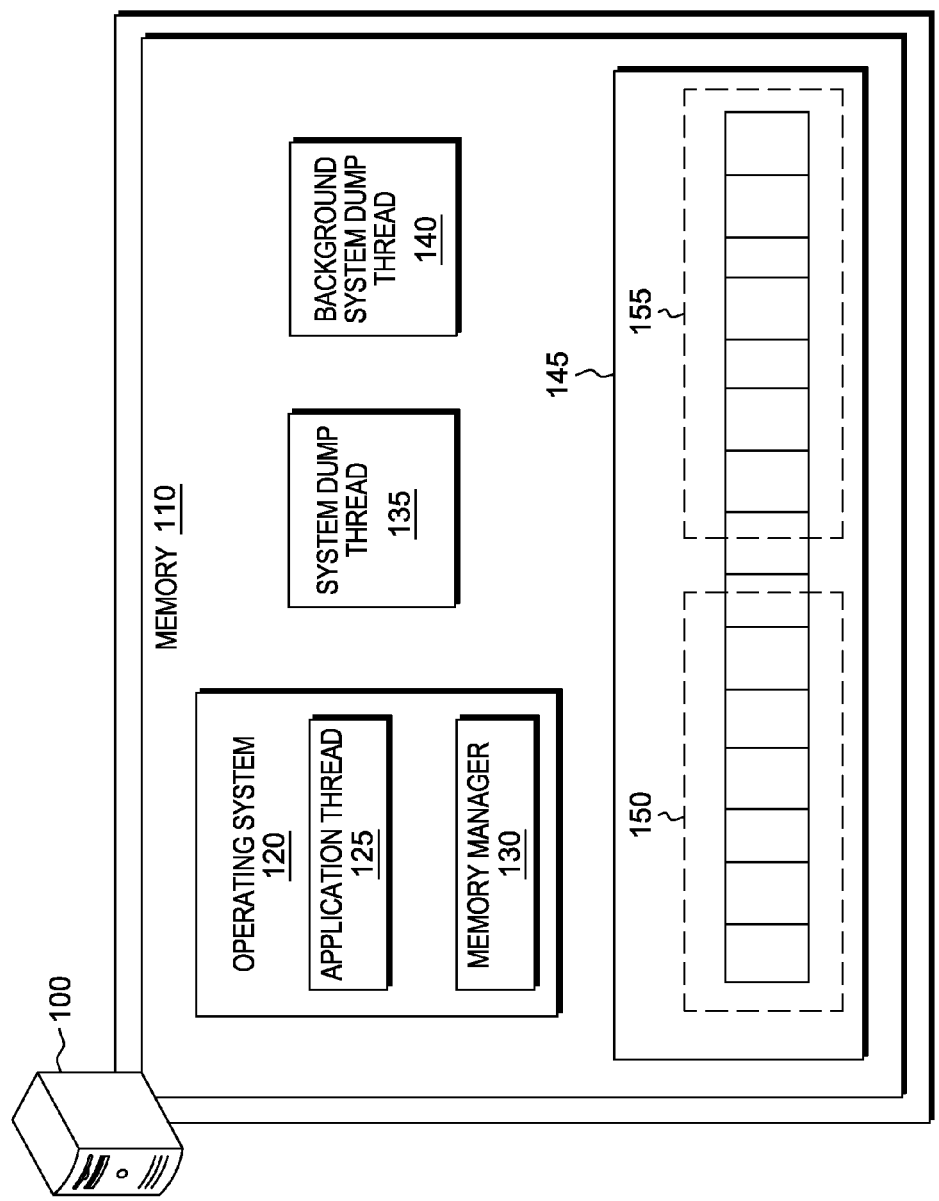
FIG. 1 is a functional block diagram of a computing device for managing system dumps of memory, in accordance with embodiments of the present invention.

The present invention will now be described in detail with reference to the accompanying Figures. Referring now to FIG. 1, a functional block diagram of computing device 100 for managing concurrent system dumps of address spaces of memory, in accordance with an embodiment of the present invention is shown. Computing device 100 can be, for example, a laptop, tablet, or notebook personal computer (PC), a desktop computer, a mainframe or mini computer, a personal digital assistant (PDA), or a smart phone such as a Blackberry® (Blackberry is a registered trademark of Research in Motion Limited (RIM) Inc., in the United States, other countries, or both) or iPhone® (iPhone is a registered trademark of Apple Inc., in the United States, other countries, or both), respectively.

Computing device 100 can also be a server computing system such as, a management server, a web server, or any other electronic device or computing system. The server computing system can also represent a "cloud" of computers interconnected by one or more networks, wherein the server computing system can be a primary server for a computing system utilizing clustered computers when accessed through a virtual computing environment of computing device 100. For example, a cloud computing system can be a common implementation of a management system that manages concurrent system dumps of large address spaces of memory of computing device 100, in accordance with embodiments of the present invention.

Computing device 100 includes memory 110. Memory 110 may comprise, for example, one or more computer-readable storage media, which may include random-access memory (RAM) such as various forms of dynamic RAM (DRAM), e.g., DDR2 SDRAM, or static RAM (SRAM), flash memory, or any other form of fixed or removable storage medium that can be used to carry or store desired program code and program data in the form of instructions or data structures and that can be accessed by other components of computing device 100. Memory 110 includes address space 145.

Address space 145 is composed of addressable memory locations for one or more program applications that execute program instructions of memory 110. Address space 145 also defines a range of discrete addresses of memory 110, each of which may correspond to a network host, peripheral device, disk sector, a memory cell or other logical or physical entity of memory 110. In an exemplary embodiment, address space 145 can be categorized into areas of high priority address spaces 150 and low priority address spaces 155. The categorization is determined based on whether address space 145 is changing frequently or infrequently, with frequent changes indicating an area of high priority address spaces and infrequent changes indicating an area of low priority address spaces. Embodiments of the present invention further comprise performance of a system dump of the frequently changing areas of address space 145, and operation of a background thread that performs a system dump of the infrequently changing areas of address space 145, respectively.

As depicted, memory 110 stores operating system 120, system dump thread 135 and background system dump thread 140. Operating system 120 includes application thread 125 and memory manager 130. Operating system 120 can be software program or a collection of software programs that provides a platform on which software applications of computing device 100 can execute. For example, a system dump is requested for address space 145 of high priority address spaces 150 and low priority address spaces 155 based on program executions of operating system 120.

Application thread 125 can be a program that compiles in a Java® (Java is a registered trademark of Oracle, Inc. in the United States other countries, or both) compiling platform, in which Java operates under a Java virtual machine (JVM) environment of operating system 120. The JVM environment can further provide a run time environment in which Java byte code can be executed in operating system 120. Additionally, the JVM environment can utilize a generational garbage collection scheme in which a system dump can be requested for application thread 125. A garbage collector scheme of the JVM environment attempts to reclaim garbage or memory occupied by objects that are no longer in use by application thread 125. The garbage collection scheme is a form of automatic memory management controlled by memory manager 130.

Memory manager 130 manages concurrent system dumps of high priority address space 150 and low priority address space 155. According to at least one embodiment, memory manager 130 determines areas of address space 145 that are likely to change frequently as application thread 125 operates on operating system 120, such as, for example, areas containing structures belonging to JVM environment of application, and also, structures containing volatile areas of memory 110, such as, garbage collector's nursery area of garbage collection scheme of memory.

Similarly, memory manager 130 also determines which areas of address space 145 are likely to change only infrequently. Areas that change infrequently might be part of part of memory 110 containing objects such as tenured areas of memory. For example, Java objects of the JVM environment reside in an area of operating system 120 known as heap. The heap is created when the JVM starts up, and may increase or decrease in size while the application runs. When the heap becomes full, garbage is collected. Additionally, according to at least one embodiment, memory manager 130 stops all applications threads of computing device 100, including application thread 125, when a system crash occurs.

Memory manager 130 executes system dump thread 135 to perform a memory system dump of memory 110 on behalf of operating system 120. System dump thread 135 performs the system dump of all frequently changing areas of address space 145, and prepares a map of the infrequently changing area of address space 145, including, for example, the area of address space 145 that still needs to be dumped. Further, memory manager 130 executes background system dump thread 140 to perform system dump of the infrequently changing areas of address space 145. Background system dump thread 140 operates in parallel with application thread 125, and is responsible for dumping all blocks of infrequently changing areas that have not yet been dumped by system dump thread 135.

Figure 2A:
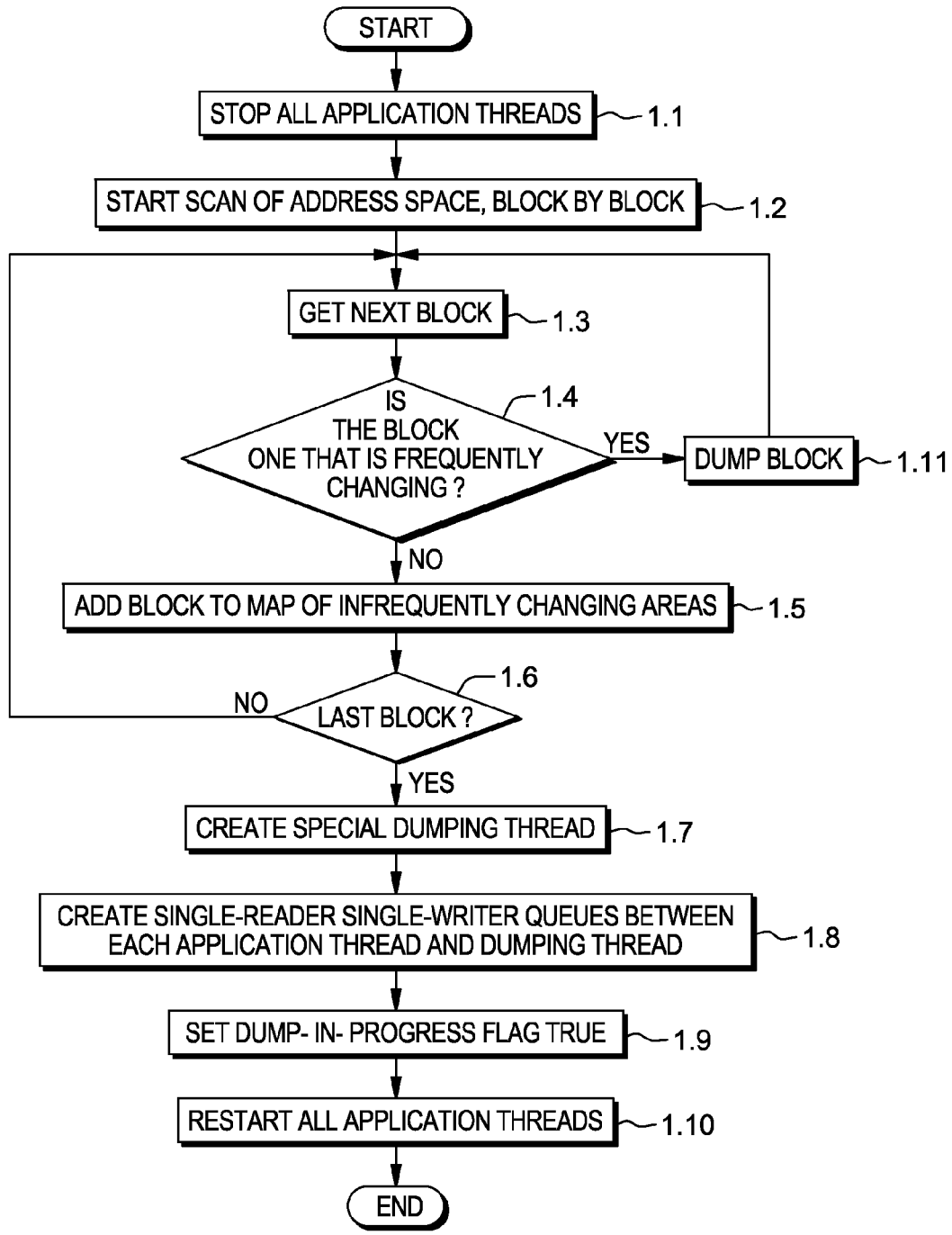
FIGS. 2A-2C are flowcharts depicting steps performed by a memory manager to perform system dumps of high priority areas of memory of a computing device, and initiating a background thread that performs system dumps of low priority areas of memory of the computing device, in accordance with embodiments of the present invention.

FIG. 2A is a flowchart depicting steps performed by memory manager 130 to determine high priority areas 150 and low priority areas 155 for performing system dump of address spaces 145 by system dump thread 135 and background system dump thread 140, in accordance with the present invention. At step 1.1, memory manager 130 stops application thread 125 from operating during system dump of computing device 100. For example, when a system crash occurs, all application threads of memory 110, including, application thread 125 are likely to be stopped by operating system 120. Further, as described, system dump thread 135 handles control of performing the system dump process, which can be a single handling routine signal of memory 110.

At step 1.2, system dump thread 135 initiates or starts a block by block scan of address space 145 during the system dump process. During the block by block scanning process, system dump thread 135 first obtains a map of address space 145 denoting memory blocks as either committed areas or live areas because only committed or live areas of address space are dumped. At step 1.3, system dump thread 135 continues to scan memory for address space 145 that are committed to determine frequently or infrequently changing address spaces 145. This step begins a loop to acquire blocks of address spaces 145 to be dumped. The loop scans all live or committed blocks in address space 145 that have memory committed and identified. At decision 1.4, system dump thread 135 determines whether the committed and identified address space 145 is frequently changing. The present invention provides an approach for dumping frequently changing areas of address space 145 before restarting application thread 125, which was stopped during the start of the system dump process, as described in step 1.1. For example, the JVM environment running a generational garbage collector scheme of operating system 120 can determine that frequently changing areas of address space 145 is an area that contains a data structure that is addressed by the JVM itself, and a nursery area of heap of operating system 120. If the block is a frequently changing block, then at step 1.11, system dump thread 135 performs a system dump of the frequently changing block.

Alternatively, a non-frequently changing area might be the tenured area of the heap. If the committed and identified address space 145 is infrequently changing, then at step 1.5, address of the block is added to a map of the address space 145 in which all infrequently changing areas are marked. This is a single map that will be shared with all of the other application threads of memory 110, including application thread 125, once application thread 125 is restarted.

At decision 1.6, system dump thread 135 terminates the loop begun at step 1.3, for instance, if system dump thread 135 determines that the last block of the address space 145 has been scanned, and all blocks have either been dumped or have been added to the map of infrequently changing blocks. At step 1.7, memory manager 130 creates background system dump thread 140, which is responsible for dumping all blocks of infrequently changing areas of address space 145 that have not been dumped, as described in FIG. 2B.

Once created, background system dump thread 140 does not run or operate until a single reader single writer queues of memory 110 are created between each of application thread 125 and background system dump thread 140. At step 1.8, memory manager 130 creates single-reader, single writer queues between application thread 125 and background system dump thread 140. For instance, memory manager 130 allocates an area for the single-reader queue that contains images of blocks of memory 110 sent from application thread 125 to background thread system dump thread 140.

According to aspects of the present invention, memory 110 contains one circular queue for each application thread 125. Each application thread 125 has a write cursor to mark the next free block. In addition, background system dump thread 140 has a read cursor that marks the next block to read. If there are no free blocks, application thread 125 waits until one is free, as described in FIG. 2C. Further, if there are no blocks to read, background system dump thread 140 performs other tasks, as also described in FIG. 2B. At step 1.9, memory manager 130 set a dump in-progress flag of memory 110. For example, once set, the dump in progress flag maintains process of memory 110 until all blocks in the address space 145 have been dumped by memory manager 130. Furthermore, the set dump in progress flag is communicated to application thread 125 immediately and before the application thread 125 is restarted.

At step 1.10, background system dump thread 140 and application thread 125 are now in a position where they can restart, and background system dump thread 140 will complete the process of system dump of the infrequently changing areas of address space 145. For example, background system dump thread 140 completes the system dump process, as described in FIG. 2B, while application thread 125 continues to operate on operating system 120, as described in FIG. 2C, respectively, in accordance with embodiments of the present invention.

Figure 2B:
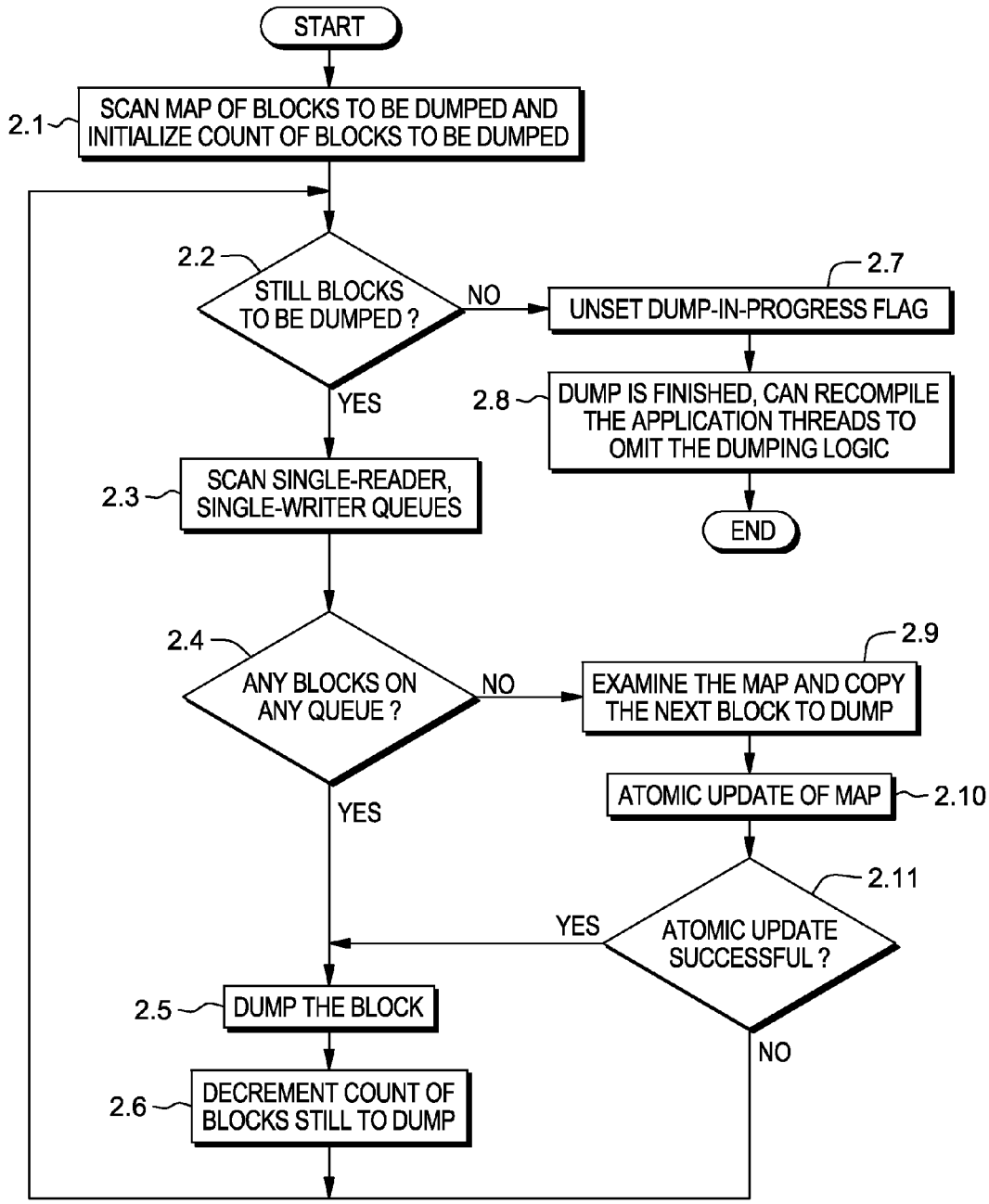

FIG. 2B is a flowchart depicting steps performed by background system dump thread 140 to perform system dump of infrequently changing areas of address space 145, in accordance with embodiments of the present invention.

At step 2.1, background system dump thread 140 scans maps of blocks of infrequently changing areas of address space 145 to be dumped. For example, background system dump thread 140 initializes a count of blocks of the infrequently changing areas to be dumped. Background system dump thread 140 stores the count of blocks of address space 145 that still needs to be dumped, and continues processing the count until the count is zero by scanning the map of blocks of the infrequently changing areas of address space 145. At decision 2.2, background system dump thread 140 determines if the count is zero, and if all blocks have been dumped.

If the count is zero, and all blocks have been dumped, then at step 2.7, background system dump 140 thread unsets the flag that was originally set in step 1.9 of FIG. 2A. For instance, in this case, the work of background system dump thread 140 is complete, at step 2.8, and background system dump thread 140 completes system dump of the infrequently changing areas of address space 145.

However, if the count of blocks is not zero, and if there are blocks still to be dumped, then at step 2.3, background system dump thread 140 scans each single reader single writer queue of the address space 145 to verify if there are any blocks on any of the queues of memory 110. For example, for single-reader single writer circular queues, background system dump thread 140 tests if the write cursor is equal to the read cursor.

At decision 2.4, background system dump thread 140 determines if there are any blocks on any of the queues of memory to be dumped. If there are blocks on any of the queues, at step 2.5, background system dump thread 140 dumps the block on the queues. For example, background system dump thread 140 writes the block to the dump, and increments the read cursor for that queue. Further, at step 2.6, background system dump thread 140 decrements count of blocks that still have to be dumped.

However, if there are no blocks on any queue, at step 2.9, background system dump thread 140 examines the map of address space, and copies the next block to dump the block. In this case, background system dump thread 140 dumps at least one block of address space. At step 2.10, background system dump thread 140 updates a map of blocks still to be dumped, and marks an entry for the dumped block to indicate that is has been dumped.

According to one aspect, background system dump thread 140 uses an atomic update mechanism to update the map of blocks of infrequently changing areas of address space that still need to be dumped. At decision 2.11, background system dump thread 140 determines if the atomic update in step 2.10 was successful. If background system dump thread 140 determines that the atomic update of the map was successful, then at step 2.5, background system dump thread 140 dumps the block. Alternatively, if on the other hand, the atomic update was not successful, background system dump thread 140 updates a map of blocks of infrequently changing areas that still to be dumped.

Figure 2C:
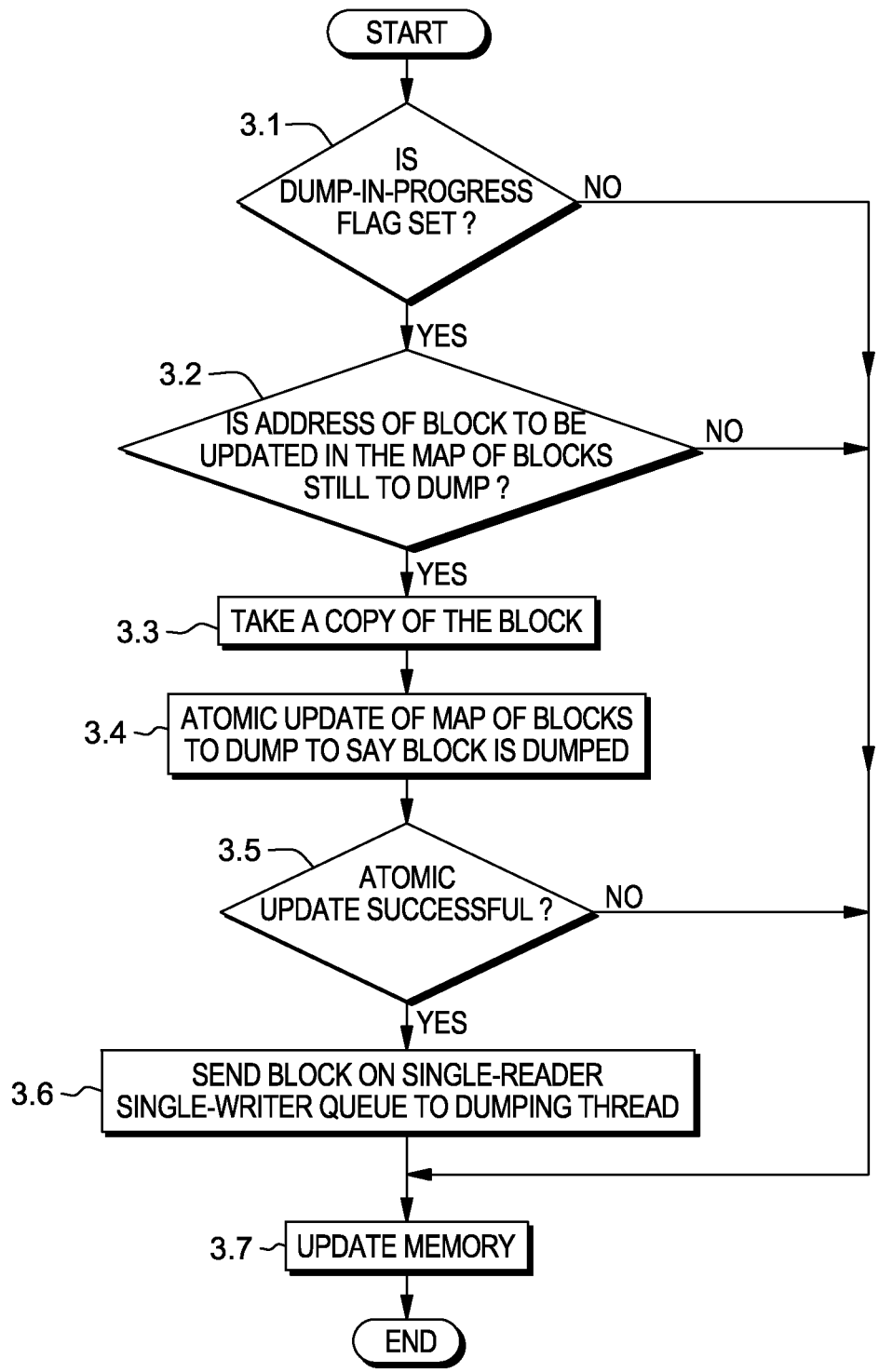

FIG. 2C is a flowchart depicting steps performed by memory manager 130 to restart application thread 125 in memory 110, in accordance with embodiments of the present invention. At step 3.1, application thread 125 determines if a system dump progress flag is set, as described in step 1.9 of FIG. 2A. If memory manager 130 determines that the flag is set, then there is at least one block that still needs to be dumped. If the flag is not set, then all blocks have been dumped, and memory manager 130 updates memory 110 of the dumped blocks.

At decision 3.2 memory manager 130 determines maps of blocks that still has to be dumped. The maps of blocks that still need to be dumped are inspected to see if the block that is about to be updated is one that has not yet been dumped. If it has already been dumped, then memory 110 is updated, as described below, at step 3.7. Further, if the memory 110 update affects a block that has not yet been dumped, at step 3.3, memory manager 130 takes a copy of the block that is to be dumped. At step 3.4, memory manager 130 updates the map of blocks still to be dumped, and marks the entry for this block to indicate that is has been dumped. For example, it uses an atomic update as described in step 2.10 in FIG. 2B.

Further, at decision 3.5 memory manager 130 determines if atomic update was successful. If atomic update was successful, then at step 3.6 memory manager 130 transmits a block on single reader single writer queue to background system dump thread 140. For example, background system dump thread 140 transmits the block on the single reader single writer queue of the background system dump thread 140. Transmitting the block to the queue involves, for example, copying the block to the entry on the queue at the write cursor. However, if atomic queue update fails, memory manager 130 continues to determine if atomic update is successful at decision 3.5. Thereafter, as described above, at step 3.7, memory manager 130 updates memory 110 within the block.

Figure 3:
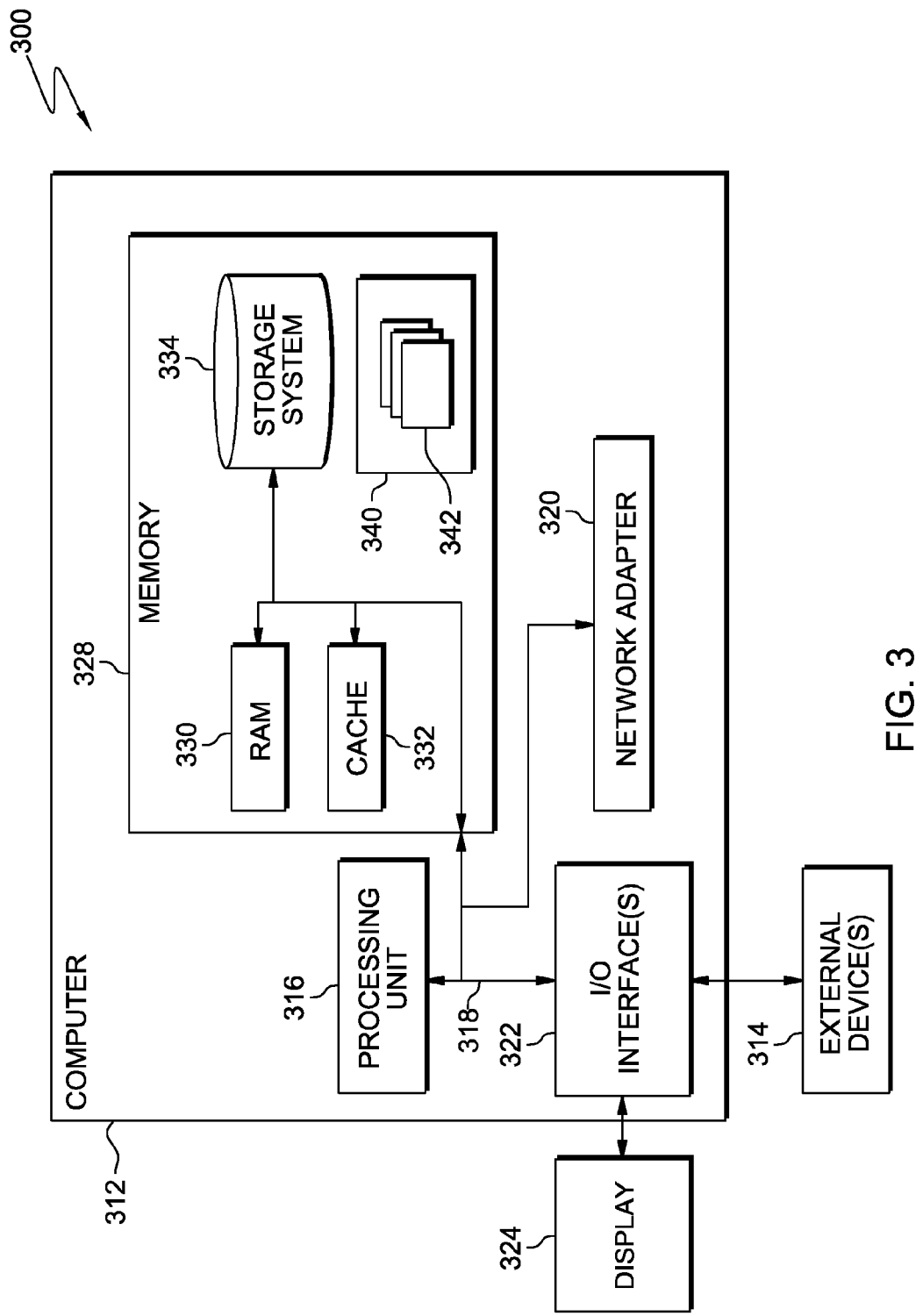
FIG. 3 illustrates a block diagram of components of a computer system in accordance with embodiments of the present invention.

FIG. 3 is a functional block diagram of a computer system 300, in accordance with an embodiment of the present invention. Computer system 300 is only one example of a suitable computer system and is not intended to suggest any limitation as to the scope of use or functionality of embodiments of the invention described herein. Regardless, computer system 300 is capable of being implemented and/or performing any of the functionality set forth hereinabove. In computer system 300 there is computer 312, which is operational with numerous other general purpose or special purpose computing system environments or configurations. Examples of well-known computing systems, environments, and/or configurations that may be suitable for use with computer 312 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computing device 100 can include or can be implemented as an instance of computer 312.

Computer 312 may be described in the general context of computer system executable instructions, such as program modules, being executed by a computer system. Generally, program modules may include routines, programs, objects, components, logic, data structures, and so on that perform particular tasks or implement particular abstract data types. Computer 312 may be practiced in distributed cloud computing environments where tasks are performed by remote processing devices that are linked through a communications network. In a distributed cloud computing environment, program modules may be located in both local and remote computer system storage media including memory storage devices.

As further shown in FIG. 3, computer 312 is shown in the form of a general-purpose computing device. The components of computer 312 may include, but are not limited to, one or more processors or processing units 316, memory 328, and bus 318 that couples various system components including memory 328 to processing unit 316.

Bus 318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 312 typically includes a variety of computer system readable media. Such media may be any available media that is accessible by computer 312, and includes both volatile and non-volatile media, and removable and non-removable media.

Memory 328 can include computer system readable media in the form of volatile memory, such as random access memory (RAM) 330 and/or cache 332. Computer 312 may further include other removable/non-removable, volatile/non-volatile computer system storage media. By way of example only, storage system 334 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 318 by one or more data media interfaces. As will be further depicted and described below, memory 328 may include at least one program product having a set (e.g., at least one) of program modules that are configured to carry out the functions of embodiments of the invention.

In an exemplary embodiment of the present invention, operating system 120 may be stored in memory 328 by way of example, and not limitation, as well as an operating system, one or more application programs, other program modules, and program data. Each of the operating system, one or more application programs, other program modules, and program data or some combination thereof, may include an implementation of a networking environment. Program modules 342 generally carry out the functions and/or methodologies of embodiments of the invention as described herein. Operating system 120 can be implemented as or can be an instance of program 340.

Computer 312 may also communicate with one or more external devices 314 such as a keyboard, a pointing device, etc., as well as display 324; one or more devices that enable a user to interact with computer 312; and/or any devices (e.g., network card, modem, etc.) that enable computer 312 to communicate with one or more other computing devices. Such communication can occur via Input/Output (I/O) interfaces 322. Still yet, computer 312 can communicate with one or more networks such as a local area network (LAN), a general wide area network (WAN), and/or a public network (e.g., the Internet) via network adapter 320. As depicted, network adapter 320 communicates with the other components of computer 312 via bus 318. It should be understood that although not shown, other hardware and/or software components could be used in conjunction with computer 312. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied thereon.

In addition, any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like, conventional procedural programming languages such as the "C" programming language, a hardware description language such as Verilog, or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Based on the foregoing a method, system and computer program product for managing concurrent system dumps of address spaces of memory have been described. However, numerous modifications and substitutions can be made without deviating from the scope of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. Therefore, the present invention has been disclosed by way of example and not limitation.

What is claimed is:

1. A method for managing concurrent system dumps of address spaces of memory, the method comprising the steps of:
    analyzing, by one or more computer processors, address space of memory to determine high priority areas and low priority areas of the address space;
    stopping, by the one or more computer processors, all application threads of memory;
    performing, by the one or more computer processors, a system dump of all the high priority areas of the address space;
    initiating, by the one or more computer processors, a background thread that performs a system dump of the low priority areas in background of the address space, and allowing all of the application threads of memory to restart; and
    creating a single reader single writer queue between each of the application threads and the background thread, to contain images of blocks of memory sent from an application thread to the background thread, the application thread having a write cursor to mark a next free block in the single reader single writer queue and the background thread having a read cursor to mark next block to read in the single reader single writer queue,
    the background thread running concurrently with the application threads, wherein the background thread performs the system dump of the low priority areas, while the application threads of memory perform functions of the application threads,
    wherein the high priority areas are frequently changing areas of the address space, and wherein the low priority areas are infrequently changing areas of the address space.

2. The method according to claim 1, further including the steps of:
    obtaining, by the one or more computer processors, a map of the address space of memory;
    dividing, by the one or more computer processors, areas of the address space into blocks;
    determining, by the one or more computer processors, whether the blocks are frequently or infrequently changing area of the address space; and
    adding, by the one or more computer processors, addresses of the blocks to maps of areas of the address space of the infrequently changing areas.

3. The method according to claim 2, wherein the step of adding, by the one or more computer processors, addresses of the blocks to maps of areas of the address space of memory of the infrequently changing areas, further comprises:
    verifying, by the one or more computer processors, the infrequently changing areas that need to be dumped.

4. The method according to claim 3, wherein the background thread scans reader and writer queues of memory to verify blocks of maps of areas of address space of the infrequently that need to be dumped.

5. The method according to claim 3, wherein if the address space of the infrequently changing areas needs to be dumped, an application thread of memory transmits a copy of the blocks of maps of areas of address space of the infrequently changing areas to a background thread to perform the system dump.

6. The method according to claim 5, further including the steps of:
    iterating, by the one or more computer processors, through the blocks of maps of areas of address space of the infrequently changing areas, and performing the system dump of any of the infrequently changing areas that have not yet been dumped;
    updating, by the one or more computer processors, the blocks of maps of areas of address space of the infrequently changing areas that need to be dumped; and
    performing, by the one or more computer processors, the system dump of the updated infrequently changing areas of the memory.

7. A computer system for managing concurrent system dumps of address spaces of memory, the computer system comprising:
    one or more processors, one or more computer-readable memories, one or more non-transitory computer-readable storage devices and program instructions which are stored on at least one of the one or more storage devices for execution by at least one of the one or more processors via at least one of the one or more memories, the program instructions comprising:
    program instructions to analyze address space of memory to determine high priority areas and low priority areas of the address space;
    program instructions to stop all application threads of memory;
    program instructions to perform system dump of all the high priority areas of the address space;
    program instructions to initiate a background thread that performs a system dump of the low priority areas in background of the address space, and allowing all of the application threads of memory to restart; and
    program instructions to create a single reader single writer queue between each of the application threads and the background thread, to contain images of blocks of memory sent from an application thread to the background thread, the application thread having a write cursor to mark a next free block in the single reader single writer queue and the background thread having a read cursor to mark next block to read in the single reader single writer queue,
    the background thread running concurrently with the application threads, wherein the background thread performs the system dump of the low priority areas, while the application threads of memory perform functions of the application threads, wherein the high priority areas are frequently changing areas of the address space, and wherein the low priority areas are infrequently changing areas of the address space.

8. The computer system according to claim 7, further includes:
program instructions to obtain a map of the address space of memory;
program instructions to divide areas of the address space into blocks;
program instructions to determine whether the blocks are frequently or infrequently changing area of the address space; and
program instructions to add addresses of the blocks to maps of areas of the address space of the infrequently changing areas.

9. The computer system according to claim 8, wherein program instructions to add addresses of the blocks to maps of areas of the address space of memory of the infrequently changing areas, further includes:
program instructions to verify the infrequently changing areas that need to be dumped.

10. The computer system according to claim 9, wherein the background thread scans reader and writer queues of memory to verify blocks of maps of areas of address space of the infrequently that need to be dumped.

11. The computer system according to claim 9, wherein if the address space of the infrequently changing areas needs to be dumped, an application thread of memory transmits a copy of the blocks of maps of areas of address space of the infrequently changing areas to a background thread to perform the system dump.

12. The computer system according to claim 11, further includes:
program instructions to iterate through the blocks of maps of areas of address space of the infrequently changing areas, and performing the system dump of any of the infrequently changing areas that have not yet been dumped;
program instructions to update the blocks of maps of areas of address space of the infrequently changing areas that need to be dumped; and
program instructions to perform the system dump of the updated infrequently changing areas of the memory.

13. A computer program product for managing concurrent system dumps of address spaces of memory, the computer program product comprising:
one or more non-transitory computer-readable storage devices and program instructions stored on at least one of the one or more storage devices, the program instructions comprising:
program instructions to analyze address space of memory to determine high priority areas and low priority areas of the address space;
program instructions to stop all application threads of memory;
program instructions to perform system dump of all the high priority areas of the address space;
program instructions to initiate a background thread that performs a system dump of the low priority areas in background of the address space, and allowing all of the application threads of memory to restart; and
program instructions to create a single reader single writer queue between each of the application threads and the background thread, to contain images of blocks of memory sent from an application thread to the background thread, the application thread having a write cursor to mark a next free block in the single reader single writer queue and the background thread having a read cursor to mark next block to read in the single reader single writer queue,
the background thread running concurrently with the application threads, wherein the background thread performs the system dump of the low priority areas, while the application threads of memory perform functions of the application threads,
wherein the high priority areas are frequently changing areas of the address space, and wherein the low priority areas are infrequently changing areas of the address space.

14. The computer program product according to claim 13, further includes:
program instructions to obtain a map of the address space of memory;
program instructions to divide areas of the address space into blocks;
program instructions to determine whether the blocks are frequently or infrequently changing area of the address space; and
program instructions to add addresses of the blocks to maps of areas of the address space of the infrequently changing areas.

15. The computer program product according to claim 13, wherein program instructions to add addresses of the blocks to maps of areas of the address space of memory of the infrequently changing areas, further includes:
program instructions to verify the infrequently changing areas that need to be dumped.

16. The computer program product according to claim 15, wherein if the address space of the infrequently changing areas needs to be dumped, an application thread of memory transmits a copy of the blocks of maps of areas of address space of the infrequently changing areas to a background thread to perform the system dump.

17. The computer program product according to claim 16, further includes:
program instructions to iterate through the blocks of maps of areas of address space of the infrequently changing areas, and performing the system dump of any of the infrequently changing areas that have not yet been dumped;
program instructions to update the blocks of maps of areas of address space of the infrequently changing areas that need to be dumped; and
program instructions to perform the system dump of the updated infrequently changing areas of the memory.

* * * * *